United States Patent [19]

Schubert et al.

[11] 4,029,305

[45] June 14, 1977

[54] PNEUMATIC VIBRATION ISOLATOR AND SUSPENSION SYSTEM

[75] Inventors: Dale W. Schubert, Sudbury; Charles M. Salerno, Wayland, both of Mass.

[73] Assignee: Barry Wright Corporation, Watertown, Mass.

[22] Filed: Oct. 10, 1975

[21] Appl. No.: 621,509

[52] U.S. Cl. .............................. 267/65 R; 280/711; 105/197 B; 267/121; 267/152
[51] Int. Cl.² .......................................... F16F 3/67.
[58] Field of Search .......... 267/65 B, 34, 35, 63 R, 267/65 R, 152, 121, 65 A, 64 A, 133, 131, 117, 122; 280/124 F, 711; 188/1 B, 298, 322; 213/43; 105/197 B; 248/358 R, 21, 22

[56] References Cited
UNITED STATES PATENTS

| | | | |
|---|---|---|---|
| 2,773,686 | 12/1956 | Nash | 105/197 B |
| 2,887,069 | 5/1959 | Lich | 267/65 A |
| 3,154,318 | 10/1964 | Hutchens | 280/124 F |
| 3,227,470 | 1/1966 | Funk | 267/65 A |
| 3,589,655 | 6/1971 | Hackbarth | 248/358 R |
| 3,815,885 | 6/1974 | Moulton et al. | 267/65 B |
| 3,836,134 | 9/1974 | Lowe et al. | 267/152 |

Primary Examiner—James B. Marbert
Attorney, Agent, or Firm—Milton E. Gilbert

[57] ABSTRACT

A self-positioning shock and vibration isolating suspension system is disclosed which incorporates one or more pneumatic mounts for supporting a load on a base. Each pneumatic mount comprises a hollow elastomer body with a diaphragm at each end, means for connecting one diaphragm to a base and the other to the load, means for pressurizing the elastomer body with a fluid so that the diaphragms and the fluid acting thereon form a pneumatic spring having a spring stiffness less than that of the hollow body, and means for varying the fluid pressure within the elastomer body in accordance with changes in the magnitude of the load.

19 Claims, 3 Drawing Figures

PNEUMATIC VIBRATION ISOLATOR AND SUSPENSION SYSTEM

This invention pertains to resilient mountings and supports for mobile or fixed equipment and more particularly to an improvement and modification of the invention disclosed in U.S. Pat. No. 3,836,134 issued 9/17/74 to Russel T. Lowe et al for Pneumatic Isolator.

The dynamic performance of automobile suspension systems is customarily tailored to provide maximum riding comfort to the occupants. However, in the agricultural and trucking equipment industries the suspension system is often designed with priority attention to vehicle operating requirements and minimum cost, and a consequent tradeoff in operator fatigue and discomfort from prolonged exposure to excessive vibration. Such fatigue and discomfort could be reduced materially by designing suspension systems which provide maximum vibration and shock attentuation of typical vehicle excitations in relation to the vehicle passenger at the frequencies where the human body is most sensitive to dynamic excitation. To achieve this objective it is essential to provide substantial vibration attentuation at the first mode of vibration of a seated human being. This requires the isolator resonant frequency to be at or below 2 cps. The vibration spectra of typical truck and tractor cab mounting points show large components of vibration at about 2 cps. With existing vehicle cab suspension systems, lowering the isolator resonance well below 2 cps would materially avoid dynamic excitation at the frequencies creating operator discomfort, but only by making the isolators undesirably large and at the expense of dynamic excursions and low rocking mode frequencies. Furthermore the use of automotive type shock absorbers to damp the isolators is unsatisfactory since they tend to lock up at higher frequencies and thus degrade rather than improve the performance of the isolators.

Therefore a primary object of this invention is to provide new and improved isolators for vehicle or other suspension systems which are capable of lowering the dynamic vibration environment imposed upon the operator or passenger by a significant degree.

A more specific object is to provide isolators for vehicle cab suspension systems which have a resonant frequency of below two cycles per second and also are highly damped.

A further requirement of the invention is to provide a vehicle cab suspension system that may be used without having to make any basic changes in the overall design of the vehicle cab.

Still another object of this invention is to provide a pheumatic mount which is capable of being used to suspend a vehicle cab so that the dynamic vibration environment imposed upon the vehicle operator is within satisfactory limits.

A further object is to provide a height-adjustable pneumatic isolator which may be used as a primary vehicle suspension system or alternatively as a secondary suspension system, e.g. to support a vehicle seat or cab.

Yet a further object is to provide a new low frequency vibration isolating mount for interposition between a load and a base.

Another object is to provide a relaxation-damped pneumatic suspension for a vehicle, that includes substantial vibration attenuation means at the critical frequencies of a seated human. This is accomplished without need for auxiliary shock absorbers and/or snubbing cushions, and without amplifying the lower frequency excitations coming from the vehicle by any objectionable degree.

These and other objects are achieved by providing a pneumatic isolator which in its preferred embodiment corresponds generally to a combination in tandem of two of the pneumatic isolators disclosed by U.S. Pat. No. 3,836,134. The tandem arrangement of the isolators provides a relatively large air chamber which is connected to a source of high pressure air. A damping orifice provides the required damping without degrading high frequency isolation, and is located in a line connecting the air chamber to an air reservoir. Such reservoir preferably is of larger volume than the air chamber. In a preferred application of the invention a height sensing air valve is employed to regulate the air pressure within the pneumatic isolator qnd reservoir so as to maintain the supported load at a selected height. In a further preferred application, two such isolators are employed to support the rear end of a vehicle cab which is pivoted at the front.

Other features and many of the attendant advantages of this invention are disclosed or rendered obvious by the following description and the corresponding drawings wherein.

In the drawings, like numerals designate like parts.

Figure 1:
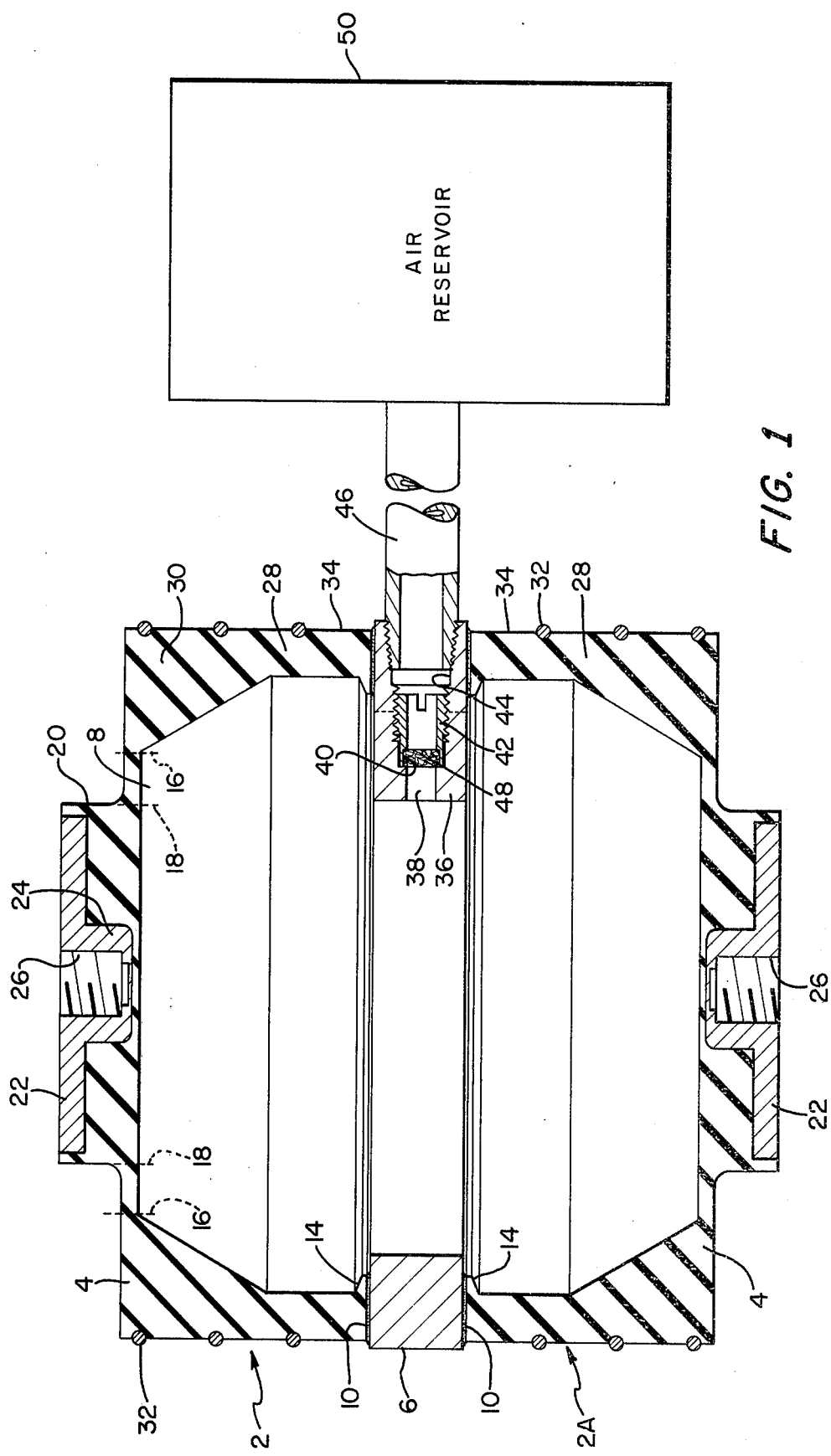
FIG. 1 is a vertical sectional view of a pneumatic isolator constituting a preferred embodiment of the invention.

Turning now to FIG. 1, the illustrated isolator is a hollow cylindrical unit that comprises two identical hollow cylindrical blocks 2 and 2A that are made of an elastomeric material and reversed relative to one another. Each block is closed off at one end by an end wall 4, while its opposite end is secured to a very stiff ring 6 preferably made of steel or some other metal or metal alloy. Blocks 2 and 2A and ring 6 form a sealed air chamber 8. Ring 6 may be secured to the two blocks by molding the latter to the former, but preferably it is secured by chemical bonding with an adhesive as indicated at 10. Preferably also the side wall 28 of each block is formed with an inside lip 14 as shown in increase the area of the end surface of the block which is available for bonding to ring 6. The end wall 4 is integral with the blocks and also is made of an elastomer so as to be capable of functioning as a diaphragm. While end walls 4 may be formed independently of the blocks and subsequently joined thereto by chemical bonding or fusion welding, it is preferred that each end wall and the associated block be molded as one piece as shown.

Each end wall 4 comprises a relatively thin annular diaphragm portion demarcated in FIG. 1 by broken lines 16 and 18, and a centrally located relatively stiff circular portion which is the portion demarcated in FIG. 1 by lines 18 and preferably but not necessarily is formed as a boss 20 projecting from the outer surface of the wall. The center portion 20 is preferably reinforced by an end plate 22 which is secured thereto in a suitable manner, e.g. by chemical bonding. Depending upon the application for which the isolator unit is intended, either or both of the plates 22 may be adapted for secure attachment to one of the two members to be isolated. Thus, plate 22 may be formed with a plug portion 24 that extends into and fills a mating cavity in boss 20 as shown, with a tapped blind hole 26 being provided in the plate coaxial with plug portion 24 as a screw-engaging means for coupling that end of the isolator unit to one of the two members to be isolated.

Preferably the inside surface of the side wall 28 of each block has a frusto-conical shape for a portion of its length commencing at the end wall 4, so that the side wall has a relatively thick portion 30 where it joins the end wall with the thickness of the portion 30 of the side wall decreasing (preferably linearly with increasing distance from the end wall). The advantage of the relatively thick wall portion 30 is that it helps assure that most of the elastic distortion that occurs on deflection of the end wall 4 is experienced substantially wholly by its circular diaphragm portion, and this allows selection of the desired lift area independently of the required isolator chamber volume.

The side wall of each elastomer block is reinforced against radial expansion, i.e. expansion away from the block's longitudinal axis, by a plurality of spaced reinforcing rings 32, that are preferably made of steel but may be made of some other high tensile strength material, e.g. an aluminum alloy. The rings serve to prevent bulging of the block under air pressure and also to improve horizontal stability, with a resulting improvement in the static load-deflection characteristic of the block.

Rings 32 are preformed and preferably, as in the illustrated embodiment, the blocks are molded to the rings (i.e., the rings are mounted in the mold cavity in which each block is molded prior to introduction of the elastomer) so that the rings are partially embedded in and bonded to the outer surfaces 34 of the blocks. Alternatively, the blocks may be molded with the rings fully embedded therein. As a still further alternative, rings 32 may be slipped over each block after the latter has been molded and then anchored in place by chemical bonding. In the latter case it is preferred that the rings be made slightly undersized so that they have to be forced onto the block. It is to be recognized also that although rings of circular cross-section are preferred, it is possible to use rings of other cross-sectional shapes, e.g. rings that are essentially flat continuous bands similar to the hoops supporting the staves of a wooden barrel. In any event, the rings are spaced so as to reinforce the blocks only at spaced regions so as not to prevent axial elastic deformation of the blocks. A ring 32 is located in a plane extending through each end wall 4 so as to provide added horizontal stiffness and stability for the upper and lower ends of the isolator. A ring is not required at the confronting ends of blocks 2 and 2A since horizontal stability at those ends is achieved by virture of their attachment to connecting ring 6. The number of rings 32 may be varied according to the axial length of the blocks.

The embodiment of FIG. 1 also includes means whereby the chamber 8 may be pressurized with air or other suitable fluid. In this connection it is to be noted that ring 6 is formed with a hole whereby a fluid under pressure may be supplied to chamber 8. Preferably but not necessarily, ring 6 is formed with an internal radially directed extension in the form of a cylindrical sleeve 36 defining an inlet or opening 38. The latter is double countersunk at its outer end, with a first smaller countersink 40 being threaded to receive a bushing 42 and a second larger countersink 44 being threaded to receive a pipe or conduit 46 which leads to an air reservoir or plenum 50. Disposed in the countersunk portion 40 of opening 38 is a damping element 48. The latter is clamped between bushing 42 and a right angle shoulder formed at the junction of opening 38 and countersink 40. Damping element 48 may take various forms (e.g., a porous plug of sintered metal or open cell plastic foam), but preferably it consists of a porous plug formed by rolling a length of knitted metal wire mesh into a helical roll and compressing the roll axially to form a dense, homogeneous and porous plug in accordance with the teachings of U.S. Pat. No. 2,334,263, issued Nov. 16, 1943 to Ralf L. Hartwell and the French patent application published Mar. 15, 1975 as Publication No. 2,241,037. Such a plug acts as a pneumatic damper since it tends to render more laminar the flow of fluid into and out of the isolator. Damping element 48 and isolator chamber 8 combine to form a relaxation-damped system which provides minimum payload accelerations and maximum isolator damping in response to typical transient excitation of equipment in the agricultural and trucking-equipment industries.

Figure 2:
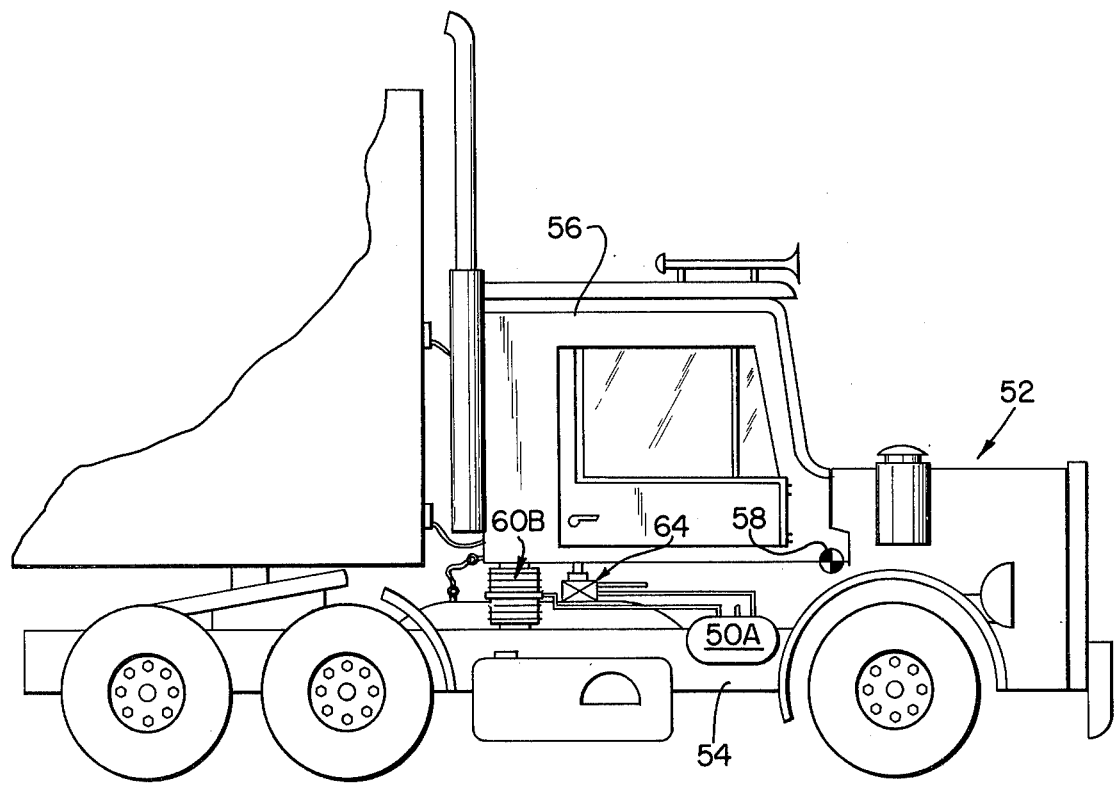
FIG. 2 is a view in side elevation of a vehicle with pneumatic isolators supporting the rear end of the vehicle.
Figure 3:
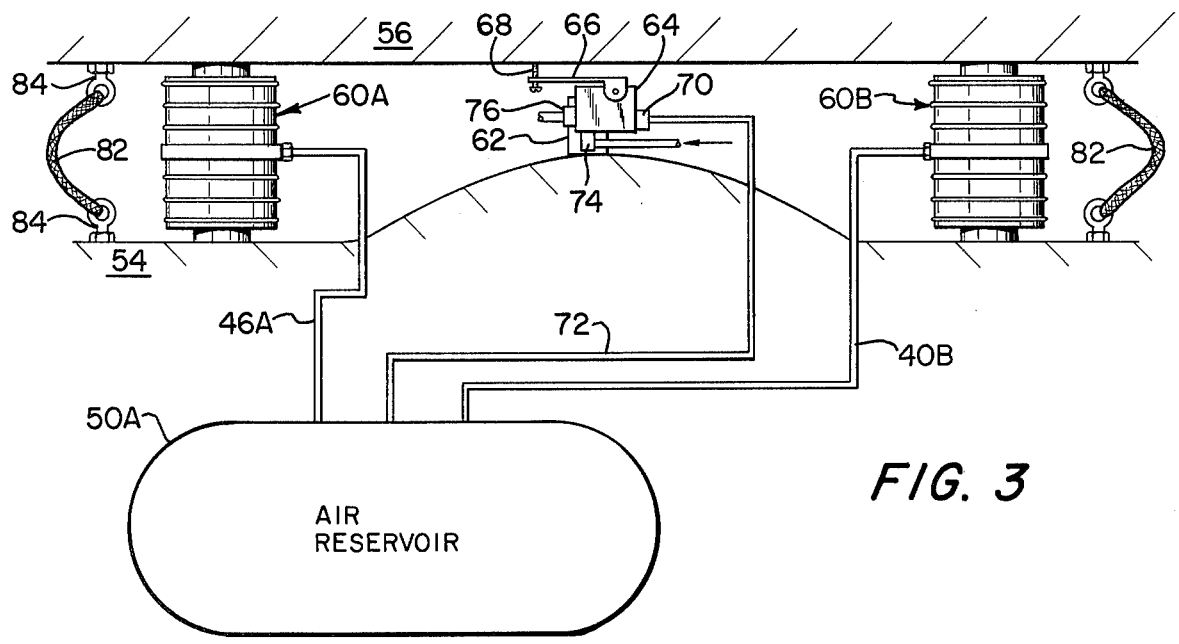
FIG. 3 is a schematic view illustrating a complete system for supporting a vehicle cab employing a pair of pneumatic isolators of the type illustrated in FIG. 1.

FIGS. 2 and 3 illustrate a vehicle cab suspension system incorporating isolators of the type hereinabove described. By way of example, the vehicle may comprise a truck tractor 52 having a frame 54 and a cab 56 which is hinged to the frame so that it can be swung upwardly and forwardly about a horizontal axis 58. The rear end of the cab is supported at its opposite sides by two actuators 60A and 60B constructed as hereinabove described. The bottom plate 22 of each isolator is bolted to the frame 54 by means of a bolt which is screwed into the tapped opening 26. The diaphragms at the upper ends of the two units 60A and 60B are similarly bolted to the cab 56. A reservoir tank 50A is attached to tractor frame 54. The reservoir 50A has two hose lines or conduits 46A and 46B which are connected to the bushings 42 of isolator units 60A and 60B respectively. Also attached to the frame 54 by means of a bracket 62 is a height regulating valve 64 of conventional design. Valve 64 has a height-sensing pivotal operating arm 66 with an adjustment screw 68 which engages the underside of cab 56. Valve 64 is provided with three ports. One port 70 is connected to air reservoir 50A by a line 72. A second port 74 is connected by a suitable line to an air supply (not shown) which is carried by the tractor, the air supply typically being an air compressor which is driven by the power plant of the tractor. The third port 76 leads to the atmosphere. Valve 64 has an internal valve member (not shown) which is connected for movement by operating arm 66 from a center equilibrium position to either of first and second operating positions. Valve 64 is designed so that when its operating valve member is in its equilibrium position, its supply port 74 and its exhaust port 76 are both closed with respect to the air reservoir port 70. Additionally if the valve member is moved in one direction to the first operating position (hereinafter called the "supply position"), the port 74 is opened with respect to port 70 so that air can flow into the reservoir 50A from the air supply. When the valve member is moved in the opposite direction to the second operating position (hereinafter called the "exhaust position"), the port 76 is opened with respect to port 70 so that air can be discharged from reservoir 50A to the atmosphere. The valve is mounted so that its valve member is in its equilibrium position when arm 66 is substantially horizontal (i.e. parallel to the plane of vehicle frame 64), and also so that upward movement of arm 66 shifts the valve to its exhaust position while downward movement shifts the valve to its supply position. Additionally, valve 64 is arranged so that arm 66 is normally spring biased upwardly so that with no load on the arm the valve is positioned to exhaust air from tank 50A. The purpose of biasing arm 66 so that the valve is normally in its exhaust position is to provide a "fail-safe" arrangement which assures that if the load of the cab is suddenly removed from the isolators due to an accident or other cause, the valve will automatically bleed the isolators and thereby will prevent them from being over-inflated and possibly damaged.

As is explained in greater detail hereinafter, valve 64 is a servo device which functions to increase or decrease the air pressure in the two isolators so as to maintain the cab at a predetermined equilibrium height above the frame 54. It is not believed necessary to illustrate or describe further details of the construction of valve 64 since it is of conventional design and also because other forms of height-sensing valves may be used in its place. By way of example but not limitation, valve 64 could be replaced by height-sensing valve means of the type described in U.S. Pat. Nos. 3,749,339 and 3,281,101 (see also U.S. Pat. Nos. 3,189,303 and 3,730,473 for height control valves).

In considering the operation of the height control valve, assume that the weight of the cab 56 which is being supported by the isolators 60A and 60B, and that the pressure exerted by the air confined within the two air chambers 8 and the air reservoir 50A are initially such that the load of the cab is at equilibrium at a height which maintains the arm 66 and thereby the valve 64 in equilibrium position. As the weight of the cab 56 is increased as, for example, by the addition of a passenger to the cab, the equilibrium between the load weight and the air pressure in the isolators is disturbed, with the result that the height of the rear end of the cab drops. When this occurs the arm 66 will move downward and thereby shift the valve 64 to its supply position so that air will be admitted to the air reservoir 50A and thereby to the isolators 60A and 60B from the air supply. As the air pressure within the two isolators increases, the diaphragms of the two isolators tend to move axially away from one another, thereby elevating the rear end of the cab upwardly toward the equilibrium position. This upward movement continues until the arm 66 returns to its equilibrium position, whereupon the valve port 74 is closed to the valve port 70 and further pressurization of the isolators is terminated.

Conversely, if the magnitude of the load is decreased sufficiently, e.g. as a result of a passenger alighting from the cab, the rear end of the cab will tend to move upwardly, causing the arm 66 to move far enough to open the exhaust port 76 with respect to port 70, so that air is exhausted from the air reservoir 50A and thereby from the two isolators. As the pressure within the two isolators decreases, the rear end of the cab will be lowered toward the equilibrium position and when that position is reached, the arm 66 will cause the valve 64 to close exhaust port 76 with respect to port 70, thereby terminating the egress of air from the tank 50A and the two isolators.

Preferably the valve is designed so that a predetermined amount of downward or upward movement of the valve operating arm 66 can occur without shifting the valve member out of its equilibrium position. This limits the speed with which the height sensors can be corrected, and thus prevents the load from oscillating or "hunting" the equilibrium height. The same results can be achieved by employing a needle valve in the lines leading from the reservoir to the isolators, the needle valve permitting control of the correction rate so as to preclude hunting.

When the vehicle is operated so that the frame 54 and the cab 56 experience vibratory displacements, the air within the two isolators alternately contract and expand, thereby storing and releasing vibratory energy. In the case of vibratory excitation experienced by frame 54, the cab is limited in its ability to follow such vibratory displacement because the resonant frequency of the two isolators is substantially lower than the frequency of the vibratory excitation. Additionally the damping element 48 damps the vibration-induced flow of air between the isolators and the air reservoir.

It is preferred but not necessary that the arm 66 and the operating valve member (not shown) of valve 64 be so connected and arranged that the arm 66 will normally be biased upwardly against the underside of the cab, thereby making it unnecessary for the arm 66 to be mechanically attached to the cab. This assures that the valve or its operating arm 66 will not be damaged accidentally in the event the rear end of the cab moves upwardly a substantial amount as, for example, when the cab is lifted. However, in certain applications it may be acceptable or desirable to mechanically connect the arm 66 or its equivalent to the load.

It is also preferred that means be provided for limiting the amount by which the cab can be lifted from the frame during vibratory excitation so as to prevent damage to the isolators. Such means preferably take the form of tethers consisting of metal cables 82 which are coupled at their opposite ends by eye bolts 84 to frame 54 and cab 56, as shown in FIG. 3.

When the device is nominally loaded, i.e., the system is in equilibrium position, the air-supported diaphragms are undeflected and most of the compressive load is supported by the pneumatic springs while the remainder is carried by the blocks 2 and 2A of the two isolators. Assuming that the applied load is within the load range for which the isolator units are designed and the chambers 8 are pressurized to the extent required for nominal loading, the diaphragms and the supporting columns of air will dynamically isolate the equipment supported by the isolator and the support structure to which the isolator is mounted. More particularly, so long as the isolators are pressurized and the loading is not excessive for the state of pressurization the load will be carried mostly by the diaphragms and the supporting air columns which coact to reduce the force transmitted from the equipment to the support structure if the equipment is the source of vibration and/or shock and also to reduce the dynamic motion transmitted to the equipment from the support structure if the latter is the source of vibration and/or shock.

If the applied load exceeds the rated load range or if the air pressure in chambers 8 drops substantially below that required for nominal loading, the diaphragms will be deflected into the blocks 2 and 2A. This deflection involves not only elastic distortion of the end walls 4 but also an increasing pull exerted by those walls on the ends of blocks 2 and 2A, with the result that the latter assume an increasing proportion of the load. Should the deflection continue far enough for the supported equipment and frame to contact the ends of the blocks, the applied load will be carried substantially fully by the blocks which will compress axially and expand radially to an extent determined by their stiffness and the applied load.

An object and advantage of this invention is provision of an isolator unit that is adapted to perform satisfactorily with different loads within a prescribed load range. This is achieved by using different air pressures with different size loads to effect nominal loading of the diaphragm and adjustment of air spring stiffness, and also by providing the blocks 2 and 2A with a spring stiffness sufficient to adequately support a load within the rated load range and the capability of compressing substantially linearly with increasing load as the applied load exceeds the upper limit of said range.

Isolators constructed as herein described offer several advantages over isolators of the type disclosed by U.S. Pat. No. 3,836,134. For one thing, provision of two diaphragms instead of one in each isolator drastically reduces the amount that each diaphragm must move and stretch for a given load deflection, and thus, for a given diameter diaphragm the isolators of this invention can accommodate greater load deflection than the isolators having only a single diaphragm. Secondly, the diaphragms have a greater useful life since they are not stressed as much (assuming the same load deflection for both types of isolators). Thirdly, the isolators herein described provide greater air volume without an increase in isolator diameter, and this is beneficial since the larger the volume of the pneumatic spring the lower its resonant frequency. Use of a reservoir air tank is advantageous in that it avoids the need to increase the overall size of the isolators to achieve a low resonant frequency, and also it allows use of damping means as herein described. Other advantages will be obvious to persons skilled in the art.

What is claimed is:

1. A device for insertion between two elements for the purpose of providing a low resonant frequency, elastically yieldable vibration isolating mount between said elements, said device comprising:
    first and second hollow cylindrical blocks each having a longitudinal axis and first and second ends spaced along said axis, said first ends being open and facing one another, and each block having a substantially planar elastically deformable diaphragm attached to and closing off its second end; and
    a stiff metal ring member disposed between said first ends of said blocks and securing said blocks together in tandem, said ring having an inner surface which defines an inner space that communicates with the interior spaces of said blocks and coacts with said interior spaces to form a single sealed chamber between said diaphragms capable of being pressurized with a compressible fluid;
    said blocks being made of an elastically deformable material so that they can shorten under a compressive load applied parallel to said axis; said diaphragms and the fluid under pressure in said chamber coacting as a pneumatic spring having a spring stiffness along said axis less than that of said blocks; and said ring member being provided with an opening leading to said chamber for introducing compressible fluid to and withdrawing compressible fluid from said chamber.

2. A device according to claim 1 further including means communicating with said opening for pressurizing said chamber with a fluid.

3. A device according to claim 2 wherein said blocks are constructed so that they resist radial expansion when they shorten under a compressive load applied parallel to said axis.

4. A device according to claim 1 further including means attached to one of said diaphragms for connecting said one diaphragm to one of said two elements.

5. A device according to claim 1 wherein at least one of said diaphragms has a boss at its center, and further including means attached to said boss for connecting said one diaphragm to one of said two elements.

6. A device according to claim 5 wherein said attaching means includes a hollow internally threaded portion that is embedded in said boss in concentric relation to said axis.

7. A spring device according to claim 1 wherein said blocks are cylindrical and including a plurality of mutually spaced metal reinforcing rings surrounding and engaging the outer surfaces of said blocks for minimizing radial expansion of said blocks.

8. An isolator device for insertion between two elements for the purpose of reducing the amount of mechanical vibrations transmitted from one to the other of said elements, said device comprising:
    a hollow structure defining an interior space and having a longitudinal axis;
    first and second means spaced along said axis and attached to said structure at first and second opposite ends respectively thereof, said first and second means closing off said interior space so as to form a pressurizable chamber, said first and second means each comprising a diaphragm that extends at substantially a right angle to said axis;
    a reservoir tank;
    valve means for selectively admitting fluid to and exhausting fluid from said tank;
    connecting means for connecting said tank with said chamber so that compressible fluid can flow between said tank and chamber; said connecting means comprising damping means for damping oscillations in the flow of said fluid between said tank and said chamber through said connecting means;
    said diaphragms each being made of an elastically deformable material so that they can be bent and stretched and thereby move along said axis toward or away from one another to compress or expand a fluid in said chamber in accordance with the pressure of said fluid and in response to changes in a compressive load applied parallel to said axis;
    said hollow structure also being made at least in part of an elastically deformable material and said diaphragms being connected thereto so that (a) substantially all of a compressive load applied parallel to said axis is carried by said diaphragms and the fluid in said chamber until said load exceeds a predetermined amount and (b) when said load exceeds said predetermined amount, substantially all of said load is carried by said hollow structure.

9. An isolator according to claim 8 wherein said diaphragms are made of the same material as said hollow structure and are integral with said hollow structure.

10. An isolator according to claim 8 further including a plurality of spaced reinforcing rings mounted to said hollow structure in coaxial relation to said axis for preventing said hollow structure from bulging out laterally away from said axis.

11. A device according to claim 8 wherein said diaphragms include means for securing said diaphragms to said elements.

12. A device for insertion between two elements for the purpose of providing a low resonant frequency, elastically yieldable vibration isolating mount between said elements, said device comprising:
   first and second hollow blocks each having a longitudinal axis and first and second ends spaced along said axis, said first ends being open and facing one another, and each block having a substantially planar elastically deformable diaphragm attached to and closing off its second end;
   a metal ring member disposed between said first ends of said blocks and securing said blocks together in tandem so that the interior spaces of said blocks form a single sealed chamber capable of being pressurized with a compressible fluid;
   an opening to said chamber;
   a reservoir tank;
   a first conduit connecting said tank with said opening;
   a supply of a pressurized compressible fluid; and
   means including valve means for selectively admitting fluid to said tank from said supply and exhausting fluid from said tank, in response to changes in the magnitude of the load exerted by one of said elements with respect to the other of said elements so as to maintain a predetermined equilibrium spacing between said elements;
   said blocks being elastically deformable so that they can shorten under a compressive load applied parallel to said axis; and said diaphragms and the fluid under pressure in said chamber coacting as a pneumatic spring having a spring stiffness along said axis less than that of said blocks.

13. A device according to claim 12 wherein said valve means comprises a valve having a first port connected to said tank, a second port connected to said supply, and a third port leading to the atmosphere, and further wherein said valve means is adapted to selectively connect said first port to said second or third ports.

14. A device according to claim 12 further including damping means interposed between said tank and said chamber for damping oscillations in the flow of fluid between said tank and said chamber.

15. A device according to claim 13 wherein said valve means is adapted to adjust the flow of compressible fluid to and from said tank according to the distance between the two elements between which the device is inserted.

16. A device according to claim 14 wherein said damping means is a porous metal plug.

17. An isolator device for insertion between two elements for the purpose of providing relaxation damping of low frequency mechanical vibrations transmitted from one to the other of said elements, said device comprising:
   a hollow structure having a longitudinal axis and being elastically deformable along said axis so as to form a mechanical spring which can shorten under a compressible load applied parallel to said axis, said hollow structure including a diaphragm at each end and defining a sealed chamber capable of being pressurized with a compressible fluid to form a pneumatic spring which is compressible along said axis;
   an opening in said chamber;
   a reservoir tank;
   means connecting said tank with said opening so that fluid may flow in either direction between said chamber and said tank;
   valve means for selectively admitting fluid to and exhausting fluid from said tank in response to changes in the magnitude of a compressive load applied parallel to said longitudinal axis; and
   damping means interposed between said tank and said chamber for damping oscillations in the flow of fluid between said tank and said chamber.

18. A self-positioning shock and vibration isolator suspension system for insertion between a base and a load, said system comprising in combination:
   at least two spaced-apart, hollow isolators, each of said isolators defining an interior space and having a longitudinal axis;
   first and second means spaced along said axis and attached to each of said isolators at first and second opposite ends respectively thereof, said first and second means closing off said interior space so as to form a pressurizable chamber, said first and second means each comprising a diaphragm that extends at substantially a right angle to said axis, and means for attaching said isolator between said load and base;
   an opening in each of said chambers;
   a reservoir tank;
   a supply of pressurized compressible fluid,
   connecting means for connecting said tank with the opening of each of said bodies;
   valve means for selectively admitting fluid from said supply to said tank and for exhausting fluid from said tank in response to changes in the magnitude of compressive forces of said load with respect to said base so as to maintain equilibrium spacing between said base and load, and
   damping means interposed between said tank and each chamber of said bodies for damping the oscillation of the flow of fluid between said tank and said chamber;
   each of said isolators being elastically deformable so that it can shorten under a compressive load applied parallel to said longitudinal axis and so that when said chamber is filled with said fluid, each of said isolators and the fluid in the corresponding chamber coact as a pneumatic spring having a pneumatic spring stiffness along said longitudinal axis less than the spring stiffness in said isolators along said longitudinal axis.

19. A device for insertion between two elements for the purpose of providing a low resonant frequency, elastically yieldable vibration isolating mount between said elements, said device comprising:
   first and second hollow blocks each having a longitudinal axis and first and second ends spaced along said axis, said first ends being open and facing one another, and each block having a substantially planar elastically deformable diaphragm attached to and closing off its second end; and
   a stiff metal ring disposed between said first ends of said blocks and securing said blocks together in tandem, said ring having an inner surface which defines an opening that communicates with the interior spaces of said blocks and is large enough to permit unrestricted flow of fluid from the interior space of one block to the interior space of the other block so that the interior spaces of said blocks form a single sealed chamber between said diaphragms which is capable of being pressurized with a compressible fluid;

said blocks being made of an elastically deformable material so that they can shorten under a compressive load applied parallel to said axis; said diaphragms and the fluid under pressure in said chamber coacting as a pneumatic spring having a spring stiffness along said axis less than that of said blocks; and said ring member being provided with an opening leading to said chamber for introducing compressible fluid to and withdrawing compressible fluid from said chamber.

* * * * *

UNITED STATES PATENT AND TRADEMARK OFFICE
CERTIFICATE OF CORRECTION

PATENT NO. : 4,029,305

DATED : June 14, 1977

INVENTOR(S) : Dale W. Schubert and Charles M. Salerno

It is certified that error appears in the above-identified patent and that said Letters Patent are hereby corrected as shown below:

Column 3, line 14: Insert after the word "linearly" the symbol for closed parenthesis; i.e., an upright curve ).

Signed and Sealed this twenty-third Day of August 1977

[SEAL]

Attest:

RUTH C. MASON
*Attesting Officer*

C. MARSHALL DANN
*Commissioner of Patents and Trademarks*